US005223366A

United States Patent [19]

Kubo et al.

[11] Patent Number: 5,223,366

[45] Date of Patent: Jun. 29, 1993

[54] CARRIERS FOR DEVELOPING ELECTROSTATIC IMAGES

[75] Inventors: Motonobu Kubo, Minoo; Hiroshi Inukai, Takatsuki; Takahiro Kitahara, Suita, all of Japan

[73] Assignee: Daikin Industries, Ltd., Japan

[21] Appl. No.: 849,452

[22] Filed: Mar. 11, 1992

Related U.S. Application Data

[62] Division of Ser. No. 420,009, Oct. 11, 1989, Pat. No. 5,145,761.

[30] Foreign Application Priority Data

| | | | |
|---|---|---|---|
| Oct. 13, 1988 | [JP] | Japan | 63-258907 |
| Oct. 13, 1988 | [JP] | Japan | 63-258908 |
| Dec. 21, 1988 | [JP] | Japan | 63-324487 |
| Jan. 31, 1989 | [JP] | Japan | 64-23564 |
| Jun. 16, 1989 | [JP] | Japan | 64-155529 |
| Jun. 16, 1989 | [JP] | Japan | 64-155530 |

[51] Int. Cl.[5] .......................... G03G 9/00; B32B 21/02; B32B 27/02; B32B 23/02

[52] U.S. Cl. .......................... 430/108; 428/407

[58] Field of Search .......................... 430/108; 428/407

[56] References Cited

U.S. PATENT DOCUMENTS

| | | | |
|---|---|---|---|
| 4,209,550 | 6/1980 | Hagenbach et al. | 430/108 X |
| 4,584,343 | 4/1986 | Löhr et al. | 428/522 |
| 4,640,966 | 2/1987 | Mitani et al. | 526/249 |
| 4,725,521 | 2/1988 | Shigeta et al. | 430/108 |
| 4,752,550 | 6/1988 | Barbetta et al. | 430/106.6 |
| 4,808,083 | 9/1989 | Nagatsuka et al. | 430/108 |
| 4,839,255 | 6/1989 | Hyosu et al. | 430/137 |

FOREIGN PATENT DOCUMENTS

| | | | |
|---|---|---|---|
| 0060657 | 4/1985 | Japan | 430/108 |
| 0202450 | 10/1985 | Japan | 430/108 |

*Primary Examiner*—Marion E. McCamish
*Assistant Examiner*—S. Crossan
*Attorney, Agent, or Firm*—Larson and Taylor

[57] ABSTRACT

The present invention provides a carrier comprising a core and a coating for developing electrostatic images, the core being formed from a specific polymer composition.

2 Claims, No Drawings

CARRIERS FOR DEVELOPING ELECTROSTATIC IMAGES

This is a division of application Ser. No. 07/420,009 filed Oct. 11, 1989, now U.S. Pat. No. 4,145,761.

FIELD OF THE INVENTION

The present invention relates to a carrier comprising a core and a coating on the core for developing electrostatic images, the carrier constituting, along with a toner, an electrostatic image developer for use with an electronic photographic copying machine (hereinafter referred to simply as "carrier").

BACKGROUND OF THE INVENTION

Known carriers include those coated with a homopolymer comprising fluorinated acrylate or fluorinated methacrylate (Japanese Unexamined Patent Publication No. 53-97,435). However, the polymer forms a coating low in durability, adhesion to the core material, strength, etc.

Also known are carriers coated with a composition comprising a polymer having crosslinkable functional groups and a crosslinking agent (Japanese Unexamined Patent Publication No.60-59,369). However, the composition tends to insufficiently crosslink depending on the crosslinking conditions, forming a coating of low durability. Functional groups in the polymer such as organic acid residues, hydroxyl, epoxy, imino, etc. are hydrophilic and result in lower or unstable electrostatic charge capacity under humid conditions.

SUMMARY OF THE INVENTION

It is the primary object of the present invention to provide a carrier comprising a core and a coating on the core, the coating being composed of a copolymer excellent in durability.

It is another object of the invention to provide a carrier comprising a core and a coating on the core, the coating having a good adhesion to the core and high strength.

It is a further object of the invention to provide a carrier comprising a core and a coating on the core, the coating having a great electrostatic charge capacity.

Other objects and features of the invention will become apparent from the following description.

We conducted extensive research to overcome the foregoing problems of the conventional techniques and found that specific copolymers exhibit outstanding properties when used for coating the carrier core.

According to the present invention, there is provided a carrier for developing electrostatic images, the carrier comprising a core and a coating on the core, the coating being formed from a copolymer or a composition containing the copolymer and having a fluorine content of about 40% by weight or more, the copolymer comprising (a) about 40 to about 70 mole % of at least one monomer selected from the group consisting of tetrafluoroethylene (TFE), trifluoroethylene (TrFE), chlorotrifluoroethylene (CTFE) and hexafluoropropylene (HFP) and (b) about 60 to about 30 mole % of at least one of the monomers represented by the formula $$CH_2{=}CHXR_f$$

wherein X is a group $$-O- \quad \text{or} \quad -O\overset{O}{\overset{\|}{C}}-,$$

and $R_f$ is a fluoroalkyl, fluorooxyalkyl, or fluoroalkenyl group (hereinafter referred to as "invention I").

According to the invention, there is also provided a carrier for developing electrostatic images, the carrier comprising a core and a coating on the core, the coating being formed from a polymer or a composition containing the polymer and having a fluorine content of about 40% by weight or more, the polymer comprising (a) about 40 to about 60 mole % of at least one monomer selected from the group consisting of tetrafluoroethylene, trifluoroethylene, chlorotrifluoroethylene and hexafluoropropylene; (b) about 50 to about 10 mole % of at least one of the monomers represented by the formula $$CH_2{=}CHXR_f$$

wherein X is a group $$-O- \quad \text{or} \quad -O\overset{O}{\overset{\|}{C}}-,$$

and $R_f$ is a fluoroalkyl, fluorooxyalkyl, or fluoroalkenyl group; and (c) about 1 to about 30 mole % of at least one monomer selected from the group consisting of vinyl ethers, vinyl esters, an acrylic or methacrylic monomer, ethylene, propylene, styrene, vinyl chloride, vinylidene chloride and vinylsilane (hereinafter referred to as "invention II").

According to the invention, there is further provided a carrier for developing electrostatic images, the carrier comprising a core and a coating on the core, the coating being formed from a polymer or a composition containing the polymer, the polymer comprising (a) about 50 to about 95 mole % of at least one monomer selected from the group consisting of tetrafluoroethylene, trifluoroethylene, chlorotrifluoroethylene and hexafluoropropylene and (d) about 50 to about 5 mole % of at least one of the monomers represented by the formula $$CH_2{=}CH\underset{(OR_2)_{3-m}}{\underset{|}{Si}}(R_1)_m$$

wherein $R_1$ is a $C_1$-$C_{20}$ alkyl group or a phenyl group, $R_2$ is a methyl, ethyl, propyl or acetyl group, and m is an integer of 0 to 3 (hereinafter referred to as "invention III").

According to the invention, there is also provided a carrier for developing electrostatic images, the carrier comprising a core and a coating on the core, the coating being formed from a copolymer or a composition containing the copolymer, the copolymer comprising a mixture of about 10 to about 99% by weight of a polymer B and about 90 to about 1% by weight of a polymer C, the polymer B containing (a) about 50 to about 95 mole % of at least one monomer selected from the group consisting of tetrafluoroethylene, trifluoroethylene, chlorotrifluoroethylene and hexafluoropropylene and (d) about 50 to about 5 mole % of at least one of the monomers represented by the formula $$CH_2{=}CHSi{+}R_1)_m$$
$$(OR_2)_{3-m}$$

wherein $R_1$ is a $C_1$-$C_{20}$ alkyl group or a phenyl group, $R_2$ is a methyl, ethyl, propyl or acetyl group, and m is an integer of 0 to 3, the polymer C containing (e) about 70 to about 99 mole % of at least one of the monomers represented by the formula $$CH_2{=}C(Y)COOR_f$$

wherein Y is a hydrogen or fluorine atom or a methyl group, and $R_f$ is a fluoroalkyl group, and (f) about 1 to about 30 mole % of at least one of the monomers represented by the formula $$CH_2{=}C(Y)COO(CH_2)_nSi(CH_3)_p$$
$$(OR_3)_{3-p}$$

wherein Y is as defined above, $R_3$ is a methyl, ethyl or propyl group, and p is an integer of 0, 1 or 2 (hereinafter referred to as "invention IV").

According to the invention, there is also provided a carrier for developing electrostatic images, the carrier comprising a core and a coating on the core, the coating being formed from a copolymer or a composition containing the copolymer, the copolymer essentially comprising (a) about 45 to about 90 mole % of at least one monomer selected from the group consisting of chlorotrifluoroethylene, tetrafluoroethylene, trifluoroethylene and hexafluoropropylene and (g) about 10 to about 55 mole % of at least one of the monomers represented by the formula $$CH_2{=}CHOOCR_4$$

wherein $R_4$ is an alkyl, cycloalkyl or an aromatic group (hereinafter referred to as "invention V").

According to the invention, there is also provided a carrier for developing electrostatic images, the carrier comprising a core and a coating on the core, the coating being formed from a composition containing a copolymer and a curing agent, the copolymer essentially comprising (a) about 40 to about 90 mole % of at least one monomer selected from the group consisting of chlorotrifluoroethylene, tetrafluoroethylene, trifluoroethylene and hexafluoropropylene; (g) about 9 to about 50 mole % of at least one of the monomers represented by the formula $$CH_2{=}CHOOCR_4$$

wherein $R_4$ is an alkyl, cycloalkyl or an aromatic group; and (h) about 1 to about 20 mole % of at least one monomer having a functional group and copolymerizable with the above monomer (hereinafter referred to as "invention VI").

According to the invention, there is also provided a carrier for developing electrostatic images, the carrier comprising a core and a coating on the core, the coating being formed from a copolymer or a composition containing the copolymer, the copolymer essentially comprising (i) about 20 to about 95 mole % of at least one monomer selected from the group consisting of chlorotrifluoroethylene, tetrafluoroethylene and hexafluoropropylene and (j) about 80 to about 5 mole % of any one of, or both of, vinyl chloride and vinylidene chloride (hereinafter referred to as "invention VII").

According to the invention, there is also provided a carrier for developing electrostatic images, the carrier comprising a core and a coating on the core, the coating being formed from a copolymer or a composition containing the copolymer, the copolymer essentially comprising (i) about 10 to about 90 mole % of at least one monomer selected from the group consisting of chlorotrifluoroethylene, tetrafluoroethylene and hexafluoropropylene; (j) about 80 to about 5 mole % of any one of, or both of, vinyl chloride and vinylidene chloride; and (k) about 1 to about 30 mole % of at least one monomer copolymerizable with the above monomer and containing an unsaturated double bond (hereinafter referred to as "invention VIII").

According to the invention, there is also provided a carrier for developing electrostatic images, the carrier comprising a core and a coating on the core, the coating being formed from a copolymer or a composition containing the copolymer, the copolymer comprising about 30 to about 70 mole % of chlorotrifluoroethylene and about 70 to about 30 mole % of propylene (hereinafter referred to as "invention IX").

According to the invention, there is also provided a carrier for developing electrostatic images, the carrier comprising a core and a coating on the core, the coating being formed from a copolymer or a composition containing the copolymer, the copolymer prepared by copolymerizing about 30 to about 70 mole % of chlorotrifluoroethylene, about 70 to about 30 mole % of propylene and an unsaturated double bond-containing monomer copolymerizable with these two monomers in an amount of about 0.1 to about 20% by weight based on the combined amount of chlorotrifluoroethylene and propylene (hereinafter referred to as "invention X").

DETAILED DESCRIPTION OF THE INVENTION

The inventions I to X will be described below in greater detail. I. Invention I

The monomer (b), i.e. one of the monomers for use in combination with at least one of (a) tetrafluoroethylene, trifluoroethylene, chlorotrifluoroethylene and hexafluoropropylene in the invention I, is represented by the formula $$CH_2{=}CHXR_f$$

wherein X is a group $$-O- \quad \text{or} \quad -\overset{O}{\overset{\|}{C}}O-\text{(printed as } -OC- \text{ with C=O)},$$

and $R_f$ is a fluoroalkyl group, fluorooxyalkyl group or fluoroalkenyl group, each having 1 to 20 carbon atoms. Examples of the monomer (b) are as follows.

$$CH_2{=}CHOCH_2CF_3$$

$$CH_2{=}CHOOCCF_3$$

$$CH_2{=}CHOCH_2(CF_2CF_2)H$$

$$CH_2{=}CHOOCCF_2CF_2H$$

-continued

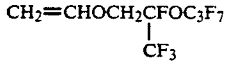

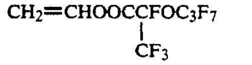

$CH_2{=}CHOCF_2CF_2H$ $CH_2{=}CHOCH_2CH_2C_8F_{17}$ $CH_2{=}CHOOCC_7F_{15}$ $CH_2{=}CHOCH_2CF_2CF_3$ $CH_2{=}CHOOCCF_2CF_3$

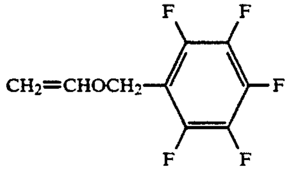

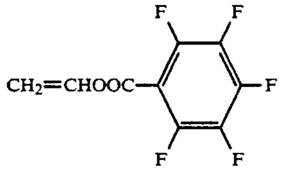

The mixing ratio (ratio by mole %) of the monomer (a) to the monomer (b) in the copolymer useful for coating the carrier core in the invention I is 40–70 : 30–60, preferably 40–60 : 60–40. The molecular weight of the copolymer is expressed in an intrinsic viscosity [η] of about 0.1 to about 1.5 as determined at 35° C. using methyl ethyl ketone or m-xylene hexafluoride as a solvent. If the monomer (a) is used in an amount of 40 mole % or less, the copolymer is deteriorated in strength when used as a coating material, thereby imparing the durability of the carrier. On the other hand, if the amount of the monomer (a) used is in excess of 70 mole %, the solubility of the copolymer in a solvent is diminished, entailing difficulty in coating the carrier core material with the coating material. Therefore the use of the monomer (a) in an amount outside said range is undesirable.

The copolymer for use in the invention I may contain, for example, an acrylic or methacrylic resin in such an amount that the addition will not impair the properties of the copolymer to be used as the coating material, for example in an amount of up to 30% by weight of the copolymer.

The carrier core can be coated by any of the conventional methods as disclosed in Japanese Unexamined Patent Publication Nos. 60-60,656, 61-120,169, etc More specifically, the surface of the carrier core is coated by the desired conventional method with a solution of the copolymer in a solvent such as acetone, methyl ethyl ketone, methyl isobutyl ketone or like ketone solvents; ethyl acetate, methyl acetate, n-butyl acetate or like acetic acid ester solvents; or tetrahydrofuran, dioxane, dimethylformamide, diethylformamide, dimethylacetamide, chloroform, 1,1,1-trichloroethane, m-xylene hexafluoride or the like. A preferred solvent has a boiling point of about 80° to about 140° C. in view of the evaporation rate and the like. After the formation of coating on the core, the carrier may be heated to a temperature up to about 150° C. to improve the properties of the coating.

The materials useful for the carrier core in the invention I are not specifically limited and can be any of conventional materials such as iron, cobalt, nickel and like metals; ferrite, magnetite, Mn-Cu-Al, Mn-Cu-Sn and like alloys; and $CrO_2$ and like metallic oxides. The carrier core is usually about 30 to about 1,000 μm, preferably about 50 to about 500 μm, in diameter.

The thickness of a coating layer to be formed on the carrier core in the invention I can be varied as desired, but is usually about 0.5 to about 50 μm, preferably about 1 to about 5 μm.

II. Invention II

In the invention II, the copolymer or a composition containing the copolymer further comprises as a third copolymerizable component (c) at least one of the following monomers in addition to the monomer components (a) and (b) used in the invention I:

Vinyl ethers: methyl vinyl ether, ethyl vinyl ether, isobutyl vinyl ether, chloroethyl vinyl ether, etc.

Vinyl esters: vinyl acetate, vinyl benzoate, vinyl versate, vinyl trichloroacetate, etc.

Acrylic or methacrylic monomers: methyl acrylate, methyl methacrylate, cyclohexyl methacrylate, etc.

Others: ethylene, propylene, styrene, vinyl chloride, vinylidene chloride, vinylsilane, etc.

When used as the monomer (c), these monomers can reduce the cost for production of the copolymer without degrading the degree of the properties of the copolymer which is attainable only with the one obtained exclusively from the monomer components (a) and (b).

The mixing ratio of the monomers in the copolymer for use in the invention II is monomer (a) / monomer (b) / monomer (c) =40–60 / 10–50 / 1–30 when the amount of the whole copolymer is taken as 100 mole %. The molecular weight of the copolymer is expressed in an intrinsic viscosity [η] of about 0.1 to about 1.5 as determined at 35° C. using as a solvent methyl ethyl ketone or m-xylene hexafluoride. If the amount of the monomer (a) in the copolymer used in the invention II is excessively small, the coating layer formed with the copolymer is deteriorated in strength to impair the durability of the carrier to be produced. In contrast, the use of the monomer (a) in an excessively large amount results in a reduction of the solubility of the copolymer in the solvent used. The use of the monomer (c) in an amount exceeding 30 mole % diminishes the quantity of electrostatic charge to be imparted, whereas the use of the monomer (c) in an amount less than 1 mole % results in a failure to produce the effect of cost reduction as mentioned hereinbefore to a satisfactory extent. Preferably, the mixing ratio of the monomers is monomer (a) / monomer (b)/ monomer (c)=45–60 / 30–50 / 10–25 in the case where the amount of the copolymer is taken as 100 mole %.

The copolymer for use in the invention II may also contain an acrylic or methacrylic resin in an amount of up to 30% by weight of the copolymer.

The same kind of the material for the carrier core and the same size thereof, the same method for coating the carrier core material, and the same thickness of the coating formed on the carrier core as in the invention I may be adopted in the inventions II to X.

Typical examples of the copolymer preferably used in the inventions I and II are as follows.

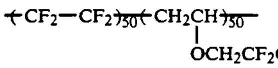
A-1

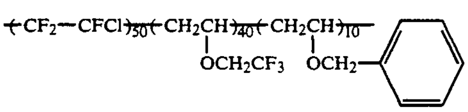
A-2

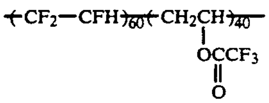
A-3

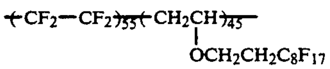
A-4

III. .Invention III

The monomer (d), i.e. one of the monomers for use in the invention III, is represented by the formula

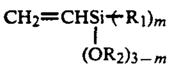

wherein $R_1$ is a $C_1$–$C_{20}$ alkyl group or a phenyl group, $R_2$ is a methyl, ethyl, propyl or acetyl group, and m is an integer of 0 to 3.

The term "alkyl group" used herein means any of those of the straight, branched and cyclic type and also means halogenated alkyl groups substituted with fluorine, chlorine, or bromine.

Specific examples of the monomer (d) are given below.

$CH_2{=}CHSi(OC_2H_5)_3$

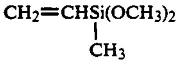

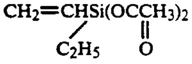

$CH_2{=}CHSi(CH_3)_2$

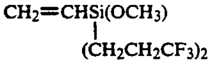

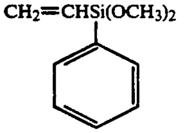

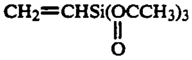

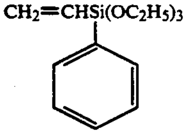

The mixing ratio (molar ratio) of the monomer (a) to the monomer (d) in the copolymer B to be used for coating the carrier core in the invention III is 50-95 : 50-5, preferably 50-60 : 50-40. The molecular weight of the copolymer B is expressed in an intrinsic viscosity [$\eta$] of about 0.1 to about 1.0 as determined at 35° C. using as a solvent methyl ethyl ketone. If the amount of the monomer (a) used is less than 50 mole %, the fluorine content is reduced to result in an insufficiency in the quantity of electrostatic charge imparted to the carrier produced. On the other hand, if the monomer (a) is used in an amount exceeding 95 mole %, the copolymer B obtained is deteriorated in adhesion to the carrier core material to impair the durability of the carrier. Therefore the use of the monomer (a) in an amount outside said range is unfavorable.

In the invention III, the copolymer B may further contain as a third copolymerizable component at least one of the following monomers in an amount of up to 40 mole % of the amount of the copolymer B:

Vinyl ethers: methyl vinyl ether, ethyl vinyl ether, isobutyl vinyl ether, chloroethyl vinyl ether, cyclohexyl vinyl ether, etc.

Vinyl esters: vinyl acetate, vinyl benzoate, vinyl versate, vinyl trichloroacetate, etc.

Acrylic or methacrylic monomers: methyl acrylate, methyl methacrylate, cyclohexyl methacrylate, etc.

Others: ethylene, propylene, vinyl chloride, vinylidene chloride, etc.

Fluorine-containing monomers:

$CH_2{=}CHOCH_2(CF_2CF_2)H$

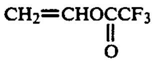

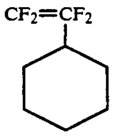

Preferred examples of the copolymer B for use in the invention III are given below.

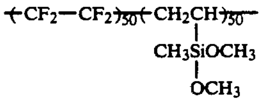
B-1

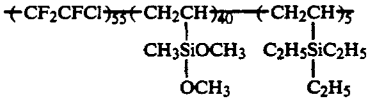
B-2

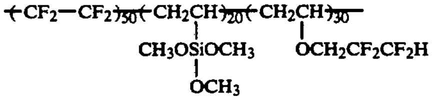
B-3

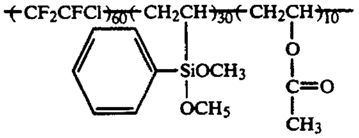
B-4

IV. Invention IV

In the invention IV, the copolymer B is combinedly used with a copolymer C comprising a monomer (e) represented by the formula $CH_2{=}C(Y)COOR_f$ wherein Y is a hydrogen of fluorine atom or a methyl group, and $R_f$ is a $C_1$–$C_{20}$ fluoroalkyl group; and a monomer (f) represented by the formula $$CH_2{=}C(Y)COO(CH_2)_nSi(CH_3)_p(OR_3)_{3-p}$$

wherein Y is as defined above, $R_3$ is a methyl, ethyl or propyl group, and p is an integer of 0, 1 or 2, in order to improve the first transition in the process of the electrical charging of the carrier and to enhance the electrostatic charge capacity of the carrier.

Examples of the monomer (e) are given below.

$CH_2{=}CHCOOCH_2CF_3$ $CH_2{=}CFCOOCH_2CF_3$ $CH_2{=}C(CH_3)COOCH_2CF_3$ $CH_2{=}CHCOOCH_2CF_2CF_2H$ $CH_2{=}C(CH_3)COOCH_2CF_3CF_2H$ $CH_2{=}CHCOOCH_2CF_2CF_3$ $CH_2{=}CClCOOCH_2CF_2CF_3$ $CH_2{=}C(CH_3)COOCH_2CF_2CF_3$ $CH_2{=}CHCOOC(CH_3)_2CF_2CF_2H$ $CH_2{=}C(CH_3)COOC(CH_3)_2CF_2CF_2H$ $CH_2{=}CHCOOCH_2CF_2CFHCF_3$ $CH_2{=}C(CH_3)COOCH_2CF_2CFHCF_3$ $CH_2{=}CFCOOCH_2(CF_2CF_2)_2H$ $CH_2{=}C(CH_3)COOCH_2(CF_2CF_2)_2H$ $CH_2{=}CHCOOCH_2C(CF_3)_2H$ $CH_2{=}C(CH_3)COOCH_2C(CF_3)_2H$ $CH_2{=}CHCOOCH_2CH_2(CF_2)_7CF_3$ $CH_2{=}C(CH_3)COOCH_2CH_2(CF_2)_7CF_3$ $CH_2{=}CHCOOCH_2CH_2(CF_2)_7CF(CF_3)_2$ $CH_2{=}C(CH_3)COOCH_2CH_2(CF_2)_7CF(CF_3)_3$ $CF_3OCF_2CF_2CH_2OCOCH{=}CH_2$ $CF_3OCF_2CF_2CH_2OCOC(CH_3){=}CH_2$ $CF_3CF_2OCF_2CF_2CH_2OCOCH{=}CH_2$ $CF_3CF_2OCF_2CF_2CH_2OCOC(CH_3){=}CH_2$ $CF_3(CF_2)_2OCF_2CF_2CH_2OCOCH{=}CH_2$ $CF_3(CF_2)_3OCF_2CF_2CH_2OCOC(CH_3){=}CH_2$ $CF_3(CF_2)_3OCF_2CF_2CH_2OCOCH{=}CH_2$ $CF_3(CF_2)_3OCF_2CF_2CH_2OCOC(CH_3){=}CH_2$

-continued

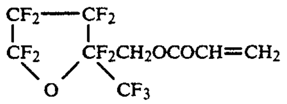

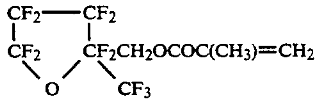

$CF_3CH_2OCH_2CH_2OCOCH{=}CH_2$ $CF_3CH_2OCH_2CH_2OCOC(CH_3){=}CH_2$ $CF_2HCF_2OCH_2CH_2OCOCH{=}CH_2$ $CF_2HCF_2OCH_2CH_2OCOC(CH_3){=}CH_2$ $CF_2HCF_2(OCH_2CH_2)OCOCH{=}CH_2$ $CF_2HCF_2(OCH_2CH_2)OCOC(CH_3){=}CH_2$ $CF_3CF_2CF_2CH_2OCH_2OCOCH{=}CH_2$ $CF_3CF_2CF_2CH_2OCH_2CH_2OCOC(CH_3){=}CH_2$

Examples of the monomer (f) are as follows.

$CH_2{=}CHCOOCH_2Si(OCH_3)_3$ $CH_2{=}C(CH_3)COOCH_2Si(OCH_3)_3$ $CH_2{=}CHCOOCH_2CH_2Si(OCH_3)_3$ $CH_2{=}C(CH_3)COOCH_2CH_2Si(OCH_3)_3$ $CH_2{=}CHCOOCH_2CH_2CH_2Si(OCH_3)_3$ $CH_2{=}C(CH_3)COOCH_2CH_2CH_2Si(OCH_3)_3$ $CH_2{=}CFCOOCH_2CH_2CH_2Si(OCH_3)_3$ $CH_2{=}CClCOOCH_2CH_2CH_2Si(OCH_3)_3$ $CH_2{=}C(CH_3)COOCH_2CH_2Si(OCH_2CH_3)_3$ $CH_2{=}C(CH_3)COOCH_2CH_2CH_2Si(CH_3)(OCH_3)_2$ $CH_2{=}CFCOOCH_2CH_2CH_2Si(OCH_2CH_2OCH_3)_3$

The mixing ratio (molar ratio) of the monomer (e) to the monomer (f) in the copolymer C to be combinedly used with the copolymer B in the invention IV is 70–99 : 1–30, preferably 90–99 : 1–10. The molecular weight of the copolymer C is expressed in an intrinsic viscosity [$\eta$] of about 0.1 to about 1.5 as determined at 35° C. using as a solvent methyl ethyl ketone or m-xylene hexafluoride. If the amount of the monomer (e) used is less than 1 mole %, the coating material obtained exhibits insufficiently in the adhesion to the core material and crosslinkability with the copolymer B to deteriorate the durability of the carrier. On the other hand, if the monomer (e) is used in an amount exceeding 30 mole %, the copolymer C is impaired in electrostatic charge capacity, leading to production of the carrier having insufficient degree of properties.

The copolymer C for use in the invention IV may further contain a copolymerizable monomer such as an acrylic or methacrylic monomer, styrene, vinylidene chloride, ethylene, propylene or like monomer in such an amount that the addition will not deteriorate the properties of the copolymer C, for example in an amount of up to 30% by weight.

Preferred examples of the copolymer C are given below.

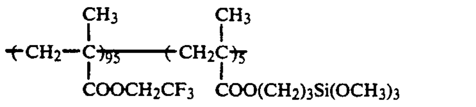
C-1

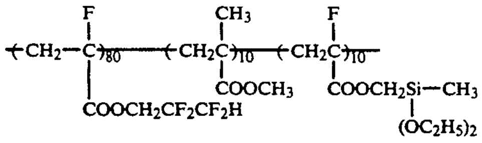
C-2

V. Invention V

A copolymer comprising at least one of (a) tetrafluoroethylene, trifluoroethylene, chlorotrifluoroethylene and hexafluoropropylene and at least one monomer represented by the formula (g)

$CH_2{=}CHOOCR_4$ wherein $R_4$ is an alkyl or cycloalkyl group or an aromatic group, is used in the invention V.

Tetrafluoroethylene and chlorotrifluoroethylene are preferably used as the monomer (a). Of these, chlorotrifluoroethylene is more preferably used.

Useful as an alkyl group represented by $R_4$ in the formula of the monomer (g) to be used in the invention V are those straight or branched and substituted with halogen atoms or the like, such as methyl, ethyl, propyl, isopropyl, butyl, isobutyl, tert-butyl, hexyl, nonyl, decyl, undecyl, dodecyl, chloromethyl, etc. Examples of the cycloalkyl group are cyclopropyl, cyclobutyl, cyclopentyl, cyclohexyl, cycloheptyl, etc. Usable as the aromatic group are phenyl which may be substituted with an alkyl group, halogen atom or a hydroxyl group or the like, naphthyl and the like, such as phenyl, methylphenyl, chlorophenyl, p-tert-butylphenyl, etc.

Specific examples of the monomer (g) are as follows.

$CH_2{=}CHOOCCH_3$, $CH_2{=}CHOOCC_2H_5$, $CH_2{=}CHOOCC_3H_7$, $CH_2{=}CHOOCC_4H_9$, $CH_2{=}CHOOCCH(CH_3)_2$, $CH_2{=}CHOOCC(CH_3)_3$, $CH_2{=}CHOOC(CH_2)_9CH_3$, $CH_2{=}CHOOC(CH_2)_{10}CH_3$,

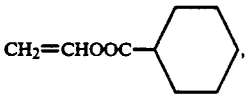,

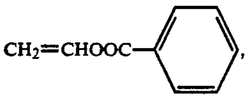,

-continued

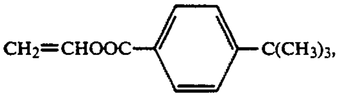, $CH_2{=}CHOOCCH_2Cl$, a compound (commertially available with trademarks such as "Veoba 10", product of Shell Chemical CO., Ltd.) represented by the formula

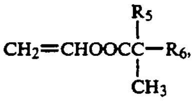, etc.

These monomers serving as the monomer (g) can be used singly or at least two of them are usable in mixture.

The mixing ratio of the monomer (a) to the monomer (g) in the copolymer to be used in the invention V is usually 45-90% : 55-10%, preferably 55-85% : 45-15%, more preferably 60-80% : 40-20%. If the amount of the monomer (a) is less than 45%, the fluorine content of the composition is reduced to afford the carrier an insufficient electrostatic charge capacity, resulting in a failure in producing the properties of the carrier to a full extent. In contrast, if the monomer (a) is used in an amount exceeding 90%, the solubility of the copolymer in the solvent is decreased, leading to the likelihood of encountering difficulty in coating the carrier core with the coating material.

In order to improve the properties of the copolymer such as glass transition temperature (Tg), solubility in the solvent, electrostatic charge capacity and the like, the copolymer for use in the invention V may further contain other monomers copolymerizable with the monomers (a) and (g) in an amount of up to 30% of the combined amount of the monomers (a) and (g) provided that such addition will not impair the properties of the copolymer. The kind of such additional monomer is not specifically limited. Usable as such monomer are, for example, styrenes such as styrene, α-methylstyrene, chloromethylstyrene and the like; alkyl acrylates or methacrylates unsubstituted or substituted in α-position such as methyl acrylate, ethyl acrylate, propyl acrylate, butyl acrylate, trifluoroethyl acrylate, pentafluoropropyl acrylate, methyl methacrylate, ethyl methacrylate, propyl methacrylate, butyl methacrylate, trifluoroethyl methacrylate, pentafluoropropyl methacrylate, methyl α-fluoroacrylate, ethyl α-fluoroacrylate, propyl α-fluoroacrylate, butyl α-fluoroacrylate, trifluoroethyl α-fluoroacrylate, pentafluoropropyl α-fluoroacrylate, methyl α-chloroacrylate, ethyl α-chloroacrylate, propyl α-chloroacrylate, butyl α-chloroacrylate, trifluoroethyl α-chloroacrylate, pentafluoropropyl α-chloroacrylate and the like; vinyl ethers such as ethyl vinyl ether, 2-chloroethyl vinyl ether, propyl vinyl ether, butyl vinyl ether, 2,2,3,3-tetrafluoropropyl vinyl ether, cyclohexyl vinyl ether and the like; vinylketones such as methyl vinylketone, ethyl vinylketone, propyl vinylketone, butyl vinylketone, phenyl vinylketone and the like; olefins such as ethylene, propylene, isobutene, butadiene, isoprene and the like; and nitrogen-containing compounds such as N-methylpyrrolidone, N-methylcarbazole, 4-vinylpyridine, acrylonitrile, methacrylonitrile and the like; haloolefins such as vinyl chloride, vinylidene chloride and the like.

The coating on the carrier core in the invention V has a glass transition temperature (Tg) of 50° C. or higher, preferably 60° C. or higher. A glass transition temperature of below 50° C. tends to render the coating soft and sticky in the step of production of the carrier or during the development by a developer with the carrier.

The molecular weight of the copolymer for use in the invention V is expressed in an intrinsic viscosity [η] of about 0.01 to about 2.0 as determined at 35° C. using as a solvent 1,1,1-trichloroethane.

The copolymer for use in the invention V can be prepared by usual radical polymerization method such as bulk polymerization, suspension polymerization, emulsion polymerization or solution polymerization. In the case of the suspension polymerization and solution polymerization, there are used one or at least two of solvents, for example, chlorine-containing solvents such as 1,1,1-trichloroethane, 1,2-dichloromethane and the like; alcohols such as tert-butanol and the like; ester solvents such as ethyl acetate and the like; ketone solvents such as acetone, methyl ethyl ketone, methyl isobutyl ketone and the like; aromatic hydrocarbons such as toluene, xylene and the like; and fluorine-containing solvents such as 1,1,2-trichloro-1,2,2-trifluoroethane, 1,2,-dichloro1,1,2,2-tetrafluoroethane and the like. In the case of the emulsion polymerization, there are employed one or at least two of emulsifying agents such as $CF_3(CF_2)_6COONH_4$, $H(CF_2)_6COONH_4$, sodium dodecylsulfate and the like.

The carrier core may be coated with a composition comprising a resin and other additives in addition to the copolymer. Examples of useful resins are vinylidene fluoride, vinylidene fluoride-ethylene tetrafluoride copolymer and like fluorine-contained resins, silicone resin, acrylic resin and like resins, etc. Useful additives are silica flour, charge controlling agents, surfactants, lubricants, etc. The amount of these resins or additives used is preferably not more than 50% by weight of the copolymer.

A wide range of organic solvents are useful unlike the case of conventional using fluorine-contained resins. Specific examples of organic solvents are ketone solvents such as acetone, methyl ethyl ketone, methyl propyl ketone, methyl isopropyl ketone, methyl isobutyl ketone and the like; acetate solvents such as ethyl acetate, cellosolve acetate, n-butyl acetate and the like; cyclic ethers such as tetrahydrofuran, dioxane and the like; aromatic hydrocarbons such as toluene, xylene and the like; halogenated hydrocarbons such as tetrachloroethylene, trichloroethylene, methylene chloride and the like; alcohols such as methyl alcohol, ethyl alcohol, butyl alcohol, tert-butyl alcohol, isopropyl alcohol and the like; fluorine-containing solvents such as 1,1,2-trifluorotrichloroethane, 1,2-difluorotetrachloroethane, hexafluorometaxylene, 1,1,2,3,4-hexafluorotetrachlorobutane and the like. These solvents are usable singly or at least two of them can be used in mixture. Preferred solvents have a boiling point of about 60° to about 140° C. in view of the evaporation rate and the like. VI. Invention VI The monomer (a) and the monomer (g) for use in the invention VI are the same as those in the invention V.

The kind of the monomer (h) to be used in the invention VI is not specifically limited insofar as the monomer (h) is copolymerizable with the monomers (a) and (g) and has a curable functional group. Examples of the monomer (h) are as follows.

Hydroxyl group-containing monomers of the vinyl ether type such as $CH_2{=}CHOCH_2CH_2CH_2CH_2OH$ $CH_2{=}CHOCH_2CH(OH)CH_3$ $CH_2{=}CHOCH_2CH_2OH$, those of the allyl ether type such as $CH_2{=}CHCH_2O(CH_2)_4OH$ $CH_2{=}CHCH_2O(CH_2)_2OH$, those of the acrylate type such as $CH_2{=}CHCOOCH_2CH_2OH$, $CH_2{=}C(CH_3)COOCH_2CH_2OH$ and the like; carboxyl-group containing monomers such as acrylic acid, methacrylic acid, itaconic acid, maleic anhydride, fumaric acid, maleic acid, α-fluoroacrylic acid, α-chloroacrylic acid and the like; epoxy group-containing monomers such as

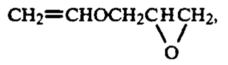

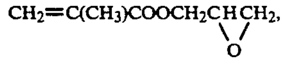

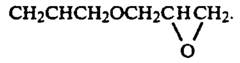

These monomers can be used singly or at least two of them are usable in mixture.

The curing agent is not limited to a specific type and can be those usually used. Usable as such curing agent are tolylenediisocyanate, isophoronediisocynate and like isocyanates, blocked isocyanates, melamines, etc. These curing agents can be those commercially available. Specific examples of such curing agent which are commercially available are isocyanates with trademarks such as "Coronate EH" and "Coronate 2094" ( product of Nippon Polyurethane Co., Ltd.), "Desmodule Z4370 and N3390" (product of Sumitomo Byer Urethane Co., Ltd.), Sumidule N3200 (product of Sumitomo Byer Urethane Co., Ltd.) and the like, blocked isocyanates with trademarks such as "Coronate 2507, 2513 and 2515" (product of Nippon Polyurethane Co., Ltd.) and melamines with trademarks such as "Melane 28" (product of Hitachi Chemical Co., Ltd.), "Saimel 303" (product of Mitsui Toatsu Chemicals, Inc.) and the like.

The mixing ratio of the monomers (a), (g) and (h) in the copolymer for use in the invention VI is usually monomer (a) / monomer (b) / monomer (c)=40–90% : 50–9% : 20–1%, preferably 45–85% : 40–10% : 15–5%, more preferably 55–80% : 35–15% : 10–5%. If less than 40% of the monomer (a) is used, the content of fluorine atoms is diminished and thus the carrier is given an insufficient electrostatic charge capacity to result in a failure in producing the properties of the carrier to a satisfactory extent. On the other hand, if the amount of the monomer (a) exceeds 90%, the solubility of the copolymer in the solvent is reduced, entailing difficulty in coating the carrier core with the coating material. The use of the monomer (h) in an amount less than 1% renders the coating material less susceptible to curing, whereas the use of more than 20% of the monomer (h) reduces the quantity of electrostatic charge and imparts the charge to the carrier with impaired stability. Therefore the use of monomer (h) in an amount outside said range is undesirable.

Preferably, the curing agent is used in such an amount that the number of functional group in the curing agent is about 1.0 to about 1.2 times the equivalence of the functional group in the copolymer. If the amount of the curing agent used is excessively small, the coating solution is less curable. In contrast, if the curing agent is used in an excessively large amount, an excessive amount thereof remains unreacted in the solution to deteriorate the electrostatic charge capacity of the carrier.

Optionally the copolymer for use in the invention VI may further contain a copolymerizable monomer in an amount of up to about 30% by weight based on the combined amount of the monomers (a), (g) and (h) insofar as the addition will not impair the properties of the copolymer in order to improve the glass transition temperature (Tg) of the copolymer, the solvent solubility thereof and the electrostatic charge capacity of the carrier. Useful as such monomer are, for example, styrene and like additional monomers as exemplified above in the description regarding the invention V.

The coating on the carier core in the invention VI has a glass transition temperature (Tg) of 40° C. or higher, preferably 50° C. or more, after the curing of the coating. A glass transition temperature of less than 40° C. tends to render the coating soft during the step of development, causing the toner to adhere to the surface of the carrier.

The molecular weight of the copolymer to be used in the invention VI is expressed in an intrinsic viscosity of about 0.01 to about 2.0 as determined at 35° C. using as a solvent chloroform or THF.

The copolymer for use in the invention VI can be prepared by the same procedure for producing the copolymer as in the invention V.

Further, the composition used as a coating material for coating the carrier core in the invention VI may contain the same resin and/or additives as in the invention V, such as fluorine-contained resin, silicone resin, acrylic resin and like resins and/or silica flour, charge controlling agents, surfactants, lubricants and like additives.

In the invention VI, the carrier core can be coated with the coating material by the same coating method as in the invention V.

VII. Invention VII

In the invention VII, at least one of chlorotrifluoroethylene, tetrafluoroethylene and hexafluoroethylene are used as the monomer (i). Among them, chlorotrifluoroethylene and tetrafluoroethylene are preferably used as the monomer (i).

As the monomer (j) to be copolymerized with the monomer (i) in the invention VII, any one of, or both of, vinyl chloride and vinylidene chloride are used.

The proportions of the monomer (i) and the monomer (j) for the copolymer in the invention VII are usually about 20 to about 95% by weight of the former and about 80 to about 5% by weight of the latter, preferably about 20 to about 60% by weight of the former and about 40 to about 80% by weight of the latter. If the amount of the former is less than 20% by weight, the carrier is given only with an insufficient electrostatic charge capacity, rendering the carrier unsatisfactory in properties. On the other hand, the use of the former in an amount exceeding 95% by weight reduces the solubility of the copolymer in the solvent, entailing difficulty in coating the carrier core with the coating solution.

The molecular weight of the copolymer for use in the invention VII is usually about 5000 to about 5 million, preferably about 10,000 to about 1 million as determined by gel permeation chromatography (calculated as polystyrene).

The copolymer for use in the invention VII can be prepared by the same procedure for producing the copolymer as in the invention V.

Further, the composition used as a coating material for coating the carrier core in the invention VII may contain the same resin and/or additives as in the invention V, such as fluorine-contained resin, silicone resin, acrylic resin and like resins and/or silica flour, charge controlling agents, surfactants, lubricants and like additives.

For preventing the release of hydrogen chloride from the copolymers used in the invention VII or in the invention VIII as will be described hereinafter, vinyl chloride, vinylidene chloride and like stabilizers are effectively usable. Useful as such stabilizer are, for example, metallic soap, epoxides, sulfites, polyol and the like.

VIII. Invention VIII

The monomer (i) and the monomer (j) to be used in the invention VIII are the same as in the invention VII.

The copolymer for use in the invention VIII comprises, in addition to the monomers (i) and (j), an unsaturated double bond-containing monomer (k) copolymerizable with these two monomers in order to improve the glass transition temperature (Tg) of the copolymer, solvent solubility thereof and electrostatic charge capacity of the carrier and to reduce the cost for preparing the carrier. The monomer (k) are the same as the above-exemplified additional monomers such as styrene in the description relating to the invention V.

The mixing ratio (weight ratio) of the monomers (i), (j) and (k) in the copolymer for use in the invention VIII is usually monomer (i) / monomer (j) / monomer (k)=10-90% : 5-80% : 1-30%, preferably 20-50% : 40-70% : 5-20%. The reason for the limitation posed on the maximum or minimum amount of the monomers (i) and (j) in use is substantially similar to that in the invention VII. If the amount of the monomer (k) used is less than 1% by weight, the copolymer obtained is substantially the same as the one of binary-system, resulting in a failure to achieve the object of improving the properties of the carrier and reducing the cost for production. On the other hand, if the monomer (k) is used in an amount exceeding 20% by weight, the quantity of electrostatic charge to be imparted to the carrier is reduced, or the carrier produced is electrically charged with poor stability. For this reason, the use of the monomer (k) in an amount outside said range is undesirable.

The molecular weight of the copolymer for use in the invention VIII is usually about 5000 to about 5 million, preferably about 10,000 to about 1 million as determined by gel permeation chromatography (calculated as polystyrene).

The copolymer for use in the invention VIII can be prepared by the same procedure for producing the copolymer as in the invention V.

Further, the composition used as a coating material for coating the carrier core in the invention VIII may contain the same resin and/or additives as in the invention V, such as fluorine-contained resin, silicone resin, acrylic resin and like resins and/or silica flour, charge controlling agents, surfactants, lubricants and like additives.

IX. Invention IX

In the invention IX, a copolymer comprising chlorotrifluoroethylene and propylene is used as a coating material.

The proportions of chlorotrifluoroethylene (CTFE) and propylene (Pr) for the copolymer in the invention IX are about 70 to about 30 mole % of the former and about 30 to about 70 mole % of the latter, preferably about 65 to about 40 mole % of the former and about 35 to about 60 mole % of the latter. If the amount of CTFE used for preparing the copolymer is less than 30 mole %, the quantity of electrostatic charge imparted to the carrier is reduced to render the carrier unsatisfactory in properties. In contrast, if CTFE is used in an amount more than 70 mole %, the coating material is deteriorated in adhesion to the core material to impair the durability of the carrier. Therefore the use of CTFE in an amount outside said range is unfavorable.

The copolymer for use in the invention IX can be prepared by the same procedure for producing the copolymer as in the invention V.

Further, the composition used as a coating material for coating the carrier core in the invention IX may contain the same resin and/or additives as in the invention V, such as fluorine-contained resin, silicone resin, acrylic resin and like resins and/or silica flour, charge controlling agents, surfactants, lubricants and like additives.

The molecular weight of the copolymer for use in the invention IX is usually about 5000 to about 5 million, preferably about 10,000 to about 1 million as determined by gel permeation chromatography (calculated as polystyrene).

X. Invention X

The copolymer for use in the invention X comprises as a third monomer component an unsaturated double bond-containing monomer (l) copolymerizable with CTFE and propylene as used in the invention IX in an amount of about 0.1 to about 20% by weight of the combined amount of CTFE and propylene.

Usable as such monomer (l) are, for example, an acrylic or methacrylic monomer such as methyl methacrylate, trifluoroethyl methacrylate and the like; fluorine-containing monomers such as tetrafluoroethylene, hexafluoroethylene, perfluoro(propyl vinyl ether), vinylidene fluoride, vinyl fluoride and the like; vinyl esters such as vinyl acetate, vinyl pivalate and the like; vinyl ethers such as ethyl vinyl ether, cyclohexyl vinyl ether, 2,2,3,3-tetrafluoropropyl vinyl ether and the like; olefins such as styrene, ethylene, isobutylene and the like; etc.

Optionally, the copolymer in the invention X may contain a copolymerizable monomer having a hetero-functional group such as hydroxybutyl vinyl ether, hydroxyethyl methacrylate, glycidyl vinyl ether and the like. A carrier can be prepared by copolymerizing this monomer with the above two monomers and coating the carrier core with the resulting mixture, followed by crosslinking.

The copolymer for use in the invention X can be prepared by the same procedure for producing the copolymer as in the invention V.

Further, the composition used as a coating material for coating the carrier core in the invention X may contain the same resin and/or additives as in the invention V, such as fluorine-contained-resin, silicone resin, acrylic resin and like resins and/or silica flour, charge controlling agents, surfactants, lubricants and like additives.

The molecular weight of the copolymer for use in the invention X is usually about 5000 to about 5 million, preferably about 10,000 to about 1 million as determined by gel permeation chromatography (calculated as polystyrene).

The carriers of the inventions I to X are used in combination with a conventional toner for development of electrostatic images. Such toner is prepared by dispersing a coloring agent in a binder resin. Useful binder resins are homopolymers, copolymers or mixtures thereof, each polymer being composed of a monomer or monomers selected from the group consisting of styrenes such as styrene, p-chlorostyrene, α-methylstyrene and the like; α-methylene fatty acid monocarboxylic acid esters such as methyl acrylate, ethyl acrylate, n-propyl acrylate, butyl acrylate, lauryl acrylate, 2-ethylhexyl acrylate, methyl methacrylate, ethyl methacrylate, n-butyl methacrylate, lauryl methacrylate, 2-ethylhexyl methacrylate and the like; vinylnitriles such as acrylonitrile, methacrylonitrile and the like; vinylpyridines such as 2-vinylpyridine, 4-vinylpyridine and the like; vinyl ethers such as methyl vinyl ether, isobutyl vinyl ether and the like; vinylketones such as methyl vinylketone, ethyl vinylketone, methyl isopropenylketone and the like; unsaturated hydrocarbons and halides thereof such as ethylene, propylene, isoprene, butadiene and the like; and chloroprene and like halogen-type unsaturated hydrocarbons. Also usable as the binder resins are rosin-modified phenolformalin resin, oil-modified epoxy resin, polyester resin, polyurethane resin, polyimide resin, cellulose resin, polyether resin and like non-vinyl resins, mixtures of the non-vinyl resin and the above vinyl resin, etc.

Examples of coloring agents for a toner are carbon black, Nigrosine, Aniline Blue, Calcoil Blue, Chrome Yellow, Ultramarine Blue, Methylene Blue, Rose Bengale, Phthalocyanine Blue, etc.

The toner may contain wax, silica, zinc stearate and like additives, when so desired.

The toner is mixed with the carrier usually in a ratio of about 0.3 to about 20 parts by weight of the former per 100 parts by weight of the latter, and the mixture is used as a developer for forming electrostatic images by magnetic brushing process, cascade process or the like.

EFFECT OF THE INVENTION

The coating layer of the carrier according to the present invention prepared from a copolymer or a composition containing the copolymer is excellent in strength, stably adheres to the core material and is therefore outstanding in durability. With this coating layer, furthermore, the first transition in the process of electrical charging of .the carrier can be completed early to afford a great electrostatic charge capacity to the carrier.

EXAMPLES

Given below are examples and comparison examples to clarify the features of the present invention in more detail.

Examples 1 to 3

A 15 g quantity of each of the copolymers A-1, A-2 and A-3 as mentioned hereinbefore was dissolved in a solvent of a mixture of ethyl acetate/n-butyl acetate (=1/1) to prepare coating solutions. One kilogram of spherical iron particles (trademark "DSP 135C", product of Dowa Iron Powder Co., Ltd.) serving as the carrier core material was coated with each solution by the conventional method using a fluidized bed apparatus, giving three kinds of carriers having a coating layer of 2 μm thickness.

Example 4

A 15 g quantity of the above-mentioned copolymer A-4 was dissolved in 500 ml of 3,3,4-hexafluorotetrachlorobutane to obtain a coating solution, and a carrier having a coating layer 2 μm in thickness was produced following the procedure employed in Example 1.

Comparison Examples 1 and 2

Two kinds of comparative carriers having a 2 μm thick-coating layer were prepared in the same manner as in Example 1 with the exception of using a mixture of 2.8 g of an urethane resin (trademark "Coronate EH" product of Nippon Polyurethane Co., Ltd.) with 15 g of each of the copolymers represented by the following formula (1) (Comparison Example 1) and the formula (2) (Comparison Example 2), respectively.

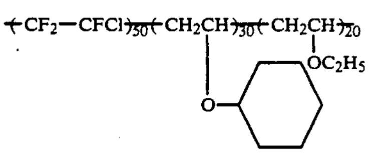

(1)

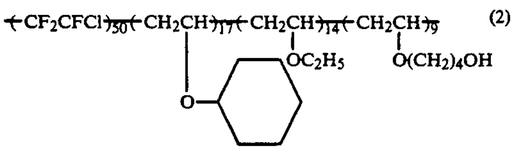

(2)

Test Example 1

Each carrier obtained in Examples 1 to 4 and Comparison Examples 1 and 2 was stirred by a ball mill for 100 hours and washed with a solvent of a 1 : 1 acetone/MEK mixture. Then the degree of peel resistance was evaluated by comparing the amounts of the coating dissolved out before and after the stirring.

Table 1 shows the results.

The evaluation of peel resistance was represented according to the following ratings:

| | |
|---|---|
| A | No peeling |
| B | Peeling occurred over less than 5% of coating portion |
| C | Peeling occurred over 5 to 10% of coating portion |
| D | Peeling occurred over 10% or more of coating portion |

Table 1

| | Degree of peel resistance |
|---|---|
| Example | |
| 1 | A |
| 2 | A |
| 3 | A |
| 4 | A |
| Comp. Example | |
| 1 | C |
| 2 | B |

Table 1 shows that the carriers of the present invention had coatings of high strength with excellent adhesion.

Test Example 2

A cluster of toner particles 10 μm in means paricle size was produced by mixing together 100 parts by weight of a polystyrene-based resin (trademark "Piccolastic D13538 , produce of Esso Standard Oil C., Ltd.), 5 parts by weight of "Biales 155" (product of Columbia Ribbon and Manufacturing Co., Ltd.) and 5 parts by weight of "Oil Black BW" (product of Orient Chemical Ltd.). A 10 parts by weight quantity of toner thus obtained was admixed with 100 parts by weight of each of the copolymers prepared in Examples 1 to 4 and Comparison Examples 1 and 2, giving carriers. Thereafter using the carriers obtained, the quantity of electrostatic charge imparted to the toner was measured by the blow-off method with the results, together with the fluorine content of each copolymer, shown below in Table 2.

In Table 2, each Roman numeral used has the following meaning.

| | |
|---|---|
| I | Fluorine content of the copolymers (% by weight) |
| II | The quantity of electrostatic charge Q/M (μc/g) imparted to the toners and measured by the blow-off method. |

TABLE 2

| Example No. | I | II |
|---|---|---|
| Example 1 | 58 | +30 |
| Example 2 | 42 | +22 |
| Example 3 | 54 | +28 |
| Example 4 | 68 | +20 |
| Comp. Ex. 1 | 26 | +8 |
| Comp. Ex. 2 | 23 | +3 |

Table 2 shows that each quantity of electrostatic charge imparted to the toners is large in the case of using the carriers of the present invention produced with the copolymer serving as a coating material and having a fluorine content of not less than 40% by weight.

In contrast, the quantity of the electrostatic charge was noticeably small in the case of using the carriers of Comparison Examples 1 and 2 obtained with the copolymers serving as coating materials and having a fluorine content less than 40% by weight.

Example 5

A 12 g quantity of the copolymer A-1 as indicated above and 3 g of an acrylic resin consisting of methyl methacrylate/ethyl methacrylate/trifluoroethyl methacrylate (=85/15/5, weight ratio) were dissolved in 500 ml of a solvent of a mixture of ethyl acetate/n-butyl acetate (=1/1) to prepare a coating solution. Using this coating solution, a carrier was produced following the procedure in Example 1.

The thus obtained carrier was evaluated for the degree of peel resistance with the result represented by the rating "A". Further the quantity of electrostatic charge imparted of the toner for the carrier was found to be +24 μc/g.

Examples 6 to 12

In a solvent of a mixture of acetone/methyl ethyl ketone/isopropanol (=45/45/10, weight ratio) was dissolved each of the above-mentioned copolymers B-1 to B-4 as singly used or in the form of a mixture with the copolymers C-1 and C-2, respectively, giving coating solutions (concentration: 2%). A cluster of spherical iron particles (trademark "DSP 135C", product of Dowa Iron Powder Co., Ltd.) serving as a carrier core material was coated with each coating solution by the known fluidized spraying method, producing sever kinds of carriers having a 2 μm thick-coating layer.

Table 3 shows the details of the copolymer used in Examples 6 to 12.

TABLE 3

| Example No. | Copolymer B (part by weight) | Copolymer C (part by weight) |
|---|---|---|
| Example 6 | B-1:100 | — |
| Example 7 | B-1:50 | C-1:50 |
| Example 8 | B-1:70 | C-1:30 |
| Example 9 | B-2:100 | — |
| Example 10 | B-2:60 | C-2:40 |
| Example 11 | B-3:100 | — |
| Example 12 | B-4:80 | C-1:20 |

Comparison Example 3

A carrier was obtained in the same manner as in Example 6 with the exception of using a coating solution prepared by dissolving a copolymer consisting of chlorotrifluoroethylene/alkyl vinyl ether/hydroxy-containing vinyl ether (trademark "Lumifron LF200", product of Asahi Glass Co., Ltd.) in xylene to a concentration of 2% and adding thereto isocyanate in a molar ratio of OH/NCO=1/1.1.

Test Example 3

Each carrier obtained in Examples 6 to 12 and Comparison Example 3 was stirred by a ball mill for 100 hours and washed with a solvent of a 1 : 1 acetone/MEK mixture. Then the degree of peel resistance was evaluated by comparing the amounts of the coating dissolved out before and after the stirring.

Table 4 shows the results.

The evaluation of peel resistance was represented according to the same ratings as in Test Example 1:

TABLE 4

| | Degree of peel resistance |
|---|---|
| Example | |
| 6 | A |
| 7 | A |
| 8 | A |
| 9 | A |
| 10 | A |
| 11 | A |
| 12 | A |
| Comp. Example | |
| 3 | B |

Table 4 shows that the carriers of the present invention had coatings of high strength with excellent adhesion.

Test Example 4

A cluster of toner particles 10 μm in mean paticle size was produced by mixing together 100 parts by weight of a polystyrene-type resin (trademark "Piccolastic D135", product of Esso Standard Oil Co., Ltd.), 5 parts by weight of "Biales 155" (product of Columbia Ribbon and Manufacturing Co., Ltd.) and 5 parts by weight of "Oil Black BW" (product of Orient chemical Ltd.). A 10 parts by weight quantity of toner thus obtained was admixed with 100 parts by weight of each of the copolymers prepared in Examples 6 to 12 and Comparison Example 3, giving carriers. Thereafter using the carriers obtained, the quantity of electrostatic charge imparted to the toner was measured by the blow-off method with the results shown below in Table 5.

TABLE 5

| Example No. | Quantity of charge imparted to toner Q/M (μc/g) |
|---|---|
| Example 6 | +20 |
| Example 7 | +28 |
| Example 8 | +25 |
| Example 9 | +18 |
| Example 10 | +27 |
| Example 11 | +27 |
| Example 12 | +24 |
| Comp. Ex. 3 | +3 |

As clear from Table 5, the carriers according to the invention produced with specific copolymers can impart a large quantity of electrostatic charge to the toners.

In comparison therewith, the quantity of the charge is remarkably low with regard to the carrier of Comparison Example 3.

Example 13

A copolymer (intrinsic viscosity: 0.52) consisting of a 72% (percentage by weight, the same hereinafter) of chlorotrifluoroethylene (hereinafter referred to as "CTFE") and 28% of vinyl acetate (hereinafter referred to as "VAc") was dissolved in a solvent of a mixture of ethyl acetate/1,1,1-trichloroethane (=1/1), giving a coating solution (concentration: 2.5%). A carrier core material (type: "DSPR-141", product of Dowa Iron Powder Co., Ltd.) was coated with the solution obtained above with use of a curtain flow coater (trademark "FL-MINI", manufactured by Freund Industry, Ltd.), giving a carrier having a coating layer 2 μm in thickness on dry basis.

Apart from the above procedure, a cluster of toner particles having a mean particle size of 10 μm was prepared by mixing together 100 parts by weight of styrene/n-butyl methacrylate copolymer (molar ratio: 85 : 15, molecular weight: 80,000, Tg: 65° C.), 2 parts by weight of a low-molecular-weight polypropylene (trademark "Viscol 660R", product of Sanyo Chemical Industry, Ltd.) and 5 parts by weight of carbon black (trademark "Regal 330R", product of Cabot Co., Ltd.), kneading and grinding the resulting mixture and classifying the particles.

A developer was produced by admixing 100 parts by weight of the carrier and 3 parts by weight of the toner obtained above with use of a blender.

Example 14

A developer was obtained by the same procedure as in Example 13 with the exception of using, as a starting material for production of a carrier, a copolymer (intrinsic viscosity: 0.66) consisting of 65% of CTFE and of VAc.

Example 15

A developer was produced in the same manner as in Example 13 with the exception of using, in the step of preparing a carrier, a copolymer (intrinsic viscosity: 0.42) consisting of 78% of CTFE and 22% of vinyl chloroacetate as dissolved in 1,1,1-trichloroethane.

Example 16

A developer was produced in the same manner as in Example 13 with the exception of using, in the step of preparing a carrier, a copolymer (intrinsic viscosity: 0.28) consisting of 55% of CTFE, 35% of vinyl versate and of cyclohexyl vinyl ether as dissolved in a solvent of a 1 : 1 methyl ethyl ketone/ethyl acetate mixture.

Example 17

A developer was prepared by the same procedure as in Example 13 with the exception of using, in the step of preparing a carrier, a copolymer (intrinsic viscosity: 0.39) consisting of 75% of tetrafluoroethylene and 25% of vinyl benzoate as dissolved in a solvent of a mixture of 1,1,1-trichloroethane/ethyl acetate (=1/1).

Example 18

A developer was produced in the same manner as in Example 13 with the exception of using, in the step of preparing a carrier, a copolymer (intrinsic viscosity: 0.69) consisting of 55% of CTFE and 45% of vinyl pivalate as dissolved in ethyl acetate.

Comparison Example 4

A developer was prepared by the same procedure as in Example 13 with the exception of using, in the step of preparing a carrier, a copolymer consisting of 80% of vinylidene fluoride and 20% bf tetrafluoroethylene as dissolved in a solvent of a 1 : 1 methyl ethyl ketone/acetone mixture.

Test Example 5

Using the developers obtained above in Examples 13 to 18 and Comparison Example 4, the quantity of electrostatic charge (Q/M, unit: μc/g) imparted to the toner was determined at a time immediately after the preparation of the developers and at a time after the standing thereof for 24 hours with use of a blow-off electrostatic charge-quantity measuring apparatus (type: "TB-200", manufactured by Toshiba Chemical Co., Ltd.).

Table 6 shows the results.

TABLE 6

| Example No. | Immediately after preparation | After standing for 24 hours |
|---|---|---|
| Example 13 | +32 | +22 |
| Example 14 | +19 | +10 |
| Example 15 | +33 | +25 |
| Example 16 | +13 | +6 |
| Example 17 | +28 | +23 |
| Example 18 | +10 | +4 |
| Comp. Ex. 4 | +44 | +10 |

Table 6 shows that the carriers of the present invention are electrically charged more stably than the one obtained in Comparison Example 4.

Test Example 6

Each developer obtained above in Examples 13 to 18 and Comparison Example 4 was stirred by a ball mill for 300 hours and the surface of the carrier was observed with a scanning electron microscope. The coating layers of the carriers of Examples 13 to 18 exhibited no change, whereas the coating layer of the carrier produced in Comparison Example 4 was found to partially peel off.

Example 19

A copolymer consisting of 55% of chlorotrifluoroethylene, 35% of vinyl versate and 10% of hydroxybutyl vinyl ether (hereinafter called "HBVE") was dissolved in a solvent of a mixture of methyl isobutyl ketone (hereinafter referred to as "MIBK")/butyl acetate (=1/1) to a concentration of 5%. A 1 kg quantity of the resulting 5% solution was admixed with 11 g of an urethane resin (trademark "Coronate EH", product of Nippon Polyurethane Co., Ltd.), giving a coating solution. A carrier core material (type: DSPR 141, product of Dowa Iron Powder Co., Ltd.) was coated with the solution obtained above to a thickness of 2 μm on dry basis using a curtain flow coater (manufactured by Freund Industry, Ltd.), and the obtained product was heat-treated in a fluid state at a temperature of 150° C. for 5 minutes. Then the product was sieved to remove the agglomerate, giving a carrier of the present invention having a mean particle size of 150 μm.

Apart from the foregoing procedure, a cluster of toner particles having a mean particle size of 10 μm was prepared by mixing together 100 parts by weight of styrene/n-butyl methacrylate copolymer (molar ratio=85/15, molecular weight: 80,000 and Tg: 65° C.), 2 parts by weight of a low-molecular-weight polypropylene (trademark "Viscol 660R", product of Sanyo Chemical Industry, Ltd.) and 5 parts by weight of carbon black (trademark "Regal 330R", product of Cabot Co., Ltd.), kneading and grinding the mixture and classifying the particles.

A developer was produced by admixing 100 parts by weight of the carrier and 3 parts by weight of the toner obtained above.

Example 20

A developer was produced in the same manner as in Example 19 with the exception of using, as a starting material for preparing the carrier, a copolymer consisting of 60% of CTFE, 33% of vinyl acetate and 7% of HBVE.

Example 21

A developer was produced by the same procedure as in Example 19 with the exception of using, in the step of preparing the carrier, a copolymer consisting of 52% of CTFE, 40% of vinyl acetate and 8% of ethylene glycol monoallyl ester as dissolved in a solvent of a mixture of toluene/MIBK/butyl acetate (=2/1/1).

Example 22

A developer was produced in the same manner as in Example 19 with the exception of using, in the step of preparing a carrier, a copolymer consisting of 50% of CTFE, 30% of vinyl pivalate, 10% of 2-hydroxypropyl vinyl ether and 10% of cyclohexyl vinyl ether as dissolved in ethyl acetate.

Comparison Example 5

A developer was prepared in the same manner as in Example 19 with the exception of using, in the step of preparing a carrier, a copolymer consisting of 80% of vinylidene fluoride and 20% of tetrafluoroethylene as dissolved in a solvent of a 1 : 1 MEK/acetone mixture.

Test Example 7

Using each developer obtained above in Examples 19 to 22 and Comparison Example 5 as placed into a 50 ml bottle, the quantity of electrostatic charge (Q/M, unit: μc/g) imparted to the toner was measured at a time after the stirring of the developer with a stirrer for 20 hours and at a time after the standing of the developer for 24 hours, using a blow-off electric charge-quantity-measuring apparatus (type: TB-200, manufactured by Toshiba Chemical Co., Ltd.).

Table 7 shows the results.

TABLE 7

| Example No. | After stirring | After standing for 24 hours |
|---|---|---|
| Example 19 | +26 | +15 |
| Example 20 | +29 | +17 |
| Example 21 | +24 | +11 |
| Example 22 | +21 | +8 |
| Comp. Ex. 5 | +38 | +12 |

Table 7 shows that the carriers of the present invention are electrically charged more stably than the one obtained in Comparison Example 5.

Test Example 8

Each developer obtained above in Examples 19 to 22 and Comparison Example 5 was stirred by a ball mill for 1 week and the surface of the carrier was observed with a scanning electron microscope. The coating layers of the carriers of Examples 19 to 22 exhibited no change, whereas the coating layer of the carrier produced in Comparison Example 5 was found to partially peel off.

Example 23

A copolymer consisting of 43% of chlorotrifluoroethylene (hereinafter referred to as "CTFE") and 57% of vinyl chloride (hereinafter called VC1") and having a molecular weight of 75,000 was dissolved in a solvent of a mixture of methyl ethyl ketone/1,2-dichloroethane (=1/1), producing a coating solution having a solids content of 2%. A cluster of spherical steel particles having a particle size of 20 μm was coated with the solution by a known fluidized spraying method to prepare a carrier having a coating layer of 2 μm thickness on dry basis.

Example 24

A copolymer consisting of a mixture of CTFE/vinylidene chloride (hereinafter referred to as "VdCl") (=25/75, molar ratio) and having a molecular weight of 120,000 was dissolved in 1,1,1-trichloroethane, and a carrier having a coating layer 2 μm in thickness on dry basis was produced following the procedure in Example 23.

Example 25

A carrier having a coating layer 2 μm in thickness on dry basis was prepared in the same manner as in Example 23 with the exception of using a coating solution obtained by dissolving a copolymer consisting of a mixture of CTFE/VC1/vinylidene fluoride (hereinafter called "VdF") (=46.5/35/19.5, molar ratio) and having a molecular weight of 110,000 in methyl ethyl ketone.

Example 26

A carrier having a coating layer 2 μm in thickness on dry basis was prepared in the same manner as in Example 23 with the exception of using a coating solution obtained by dissolving a copolymer consisting of a mixture of CTFE/VCl/vinyl acetate (=52/42/6, molar ratio) and having a molecular weight of 80,000 in a solvent of a mixture of ethyl acetate/methyl ethyl ketone (=2/8).

Example 27

A carrier having a coating layer 2 μm in thickness on dry basis was produced by the same procedure as in Example 23 with the exception of using a coating solution obtained by dissolving a copolymer consisting of a mixture of tetrafluoroethylene (hereinafter referred to as "TFE")/VCl (=42.8/57.2, molar ratio) and having a molecular weight of 60,000 in a solvent of a mixture of methyl ethyl ketone/acetone (=1/1).

Example 28

A carrier having a coating layer 2 μm in thickness on dry basis was prepared in the same manner as in Example 23 with the exception of using a coating solution obtained by dissolving a copolymer consisting of a mixture of TFE/VCl/styrene (=33/49/18, molar ratio) and having a molecular weight of 75,000 in a solvent of a mixture of methyl ethyl ketone/trichloroethane (=2/1).

Comparison Example 6

A carrier having a coating layer 2 μm in thickness on dry basis was produced in the same manner as in Example 23 with the exception of using 2,2,3,3,4,4,5,5-octafluoropentyl methacrylate copolymer (molecular weight: 100,000).

Comparison Example 7

A carrier having a coating layer 2 μm in thickness on dry basis was prepared in the same manner as in Example 23 with the exception of using a copolymer (molecular weight: 100,000) consisting of a mixture of VdF/TFE (=80/20, molar ratio) and a solvent of a mixture of acetone/methyl ethyl ketone (=1/1).

Test Example 9

Using the carriers obtained in Examples 23 to 28 and Comparison Examples 6 and 7, a test for measuring the quantity of electrostatic charge imparted to the toner was conducted as follows.

A 100 parts by weight quantity of each carrier was admixed with 10 parts by weight of toner having a mean particle size of 10 μm and consisting of 100 parts by weight of styrene-based resin (trademark "Piccolastic D125", product of Shell Standard Oil Co., Ltd.), 10 parts by weight of carbon black (trademark "Regal 660R", product of Cabot Co., Ltd.) and 5 parts by weight of a low-molecular-weight polypropylene (trademark "Viscol 660P", product of Sanyo Chemical Industry, Ltd.), and the quantity of electrostatic charge imparted to the toner (Q/M, unit: μc/g) was determined by the flow-off method.

Further, after the stirring of the mixture of the toner and the carrier by a ball mill for 1000 hours, the quantity of the charge imparted to the toner (Q/M, Unit: μc/g) was determined once again by the blow-off method.

Table 8 indicates the results.

TABLE 8

| Example No. | Initial value | After 1000 hrs |
|---|---|---|
| Example 23 | +20 | +16 |
| Example 24 | +16 | +10 |
| Example 25 | +23 | +19 |
| Example 26 | +20 | +16 |
| Example 27 | +19 | +14 |
| Example 28 | +16 | +10 |
| Comp. Ex. 6 | +21 | +2 |
| Comp. Ex. 7 | +36 | +5 |

Table 8 shows that the carriers of the present invention are electrically charged more stably than those obtained in comparison Examples 6 and 7.

Example 29

A copolymer consisting of a mixture of CTFE/Pr (=53/47, molar ratio) was dissolved in a solvent of a mixture of ethyl acetate/methyl ethyl ketone (=1/1, weight ratio), giving a coating solution having a solids content of 2%. Thereafter a cluster of steel particles 200 μm in particle size serving as a carrier core material was coated with the solution by a known fluidized spraying method to produce a carrier having a resinous coating layer 2 μm in thickness.

Example 30

A carrier having a resinous coating layer 2 μm in thickness was prepared in the same manner as in Example 29 with the exception of using a copolymer consisting of a mixture of CTFE/Pr/trifluoroethyl vinyl ether (=51/35/14, molar ratio) and having a molecular weight of 80,000.

Example 31

A copolymer consisting of a mixture of CTFE/Pr-/hydroxybutyl vinyl ether (=50/45/5, molar ratio) and having a molecular weight of 450,000 was dissolved in a solvent of a mixture of ethyl acetate/methyl ethyl ketone (=1/1, weight ratio), giving a solution having a solids content of 2 wt%. To the solution thus obtained was added a hexanemethylenediisocyanate trimer (trademark "Coronate EH" product of Nippon Polyurethane Co., Ltd.) in an amount of 13% by weight based on the weight of the resin, producing a coating solution.

Using the solution obtained, a carrier having a resinous coating layer 2 μm in thickness was prepared following the procedure in Example 29.

To fully cure the resinous layer, the carrier of this example was evaluated for various properties after 7 days from the formation of the layer.

Example 32

With 60 parts by weight of a fluorine-contained resin obtained in the same manner as in Example 29 was mixed 40 parts by weight of 2,2,3,3-tetrafluoromethyl methacrylate polymer (molecular weight: 100,000) to prepare a copolymer. Following the procedure in Example 29, the copolymer obtained was dissolved in a solvent and a carrier core material was coated with the thus obtained coating solution, whereby a carrier having a 2 μm-thick resinous coating layer was produced.

Comparison Example 8

A comparative carrier having a 2 μm-thick coating layer was obtained in the same manner as in Example 29 with the exception of using 2,2,3,3,4,4,5,5-octafluoropentyl methacrylate polymer (molecular weight: 100,000).

Comparison Example 9

A comparative carrier having a 2 μm-thick coating layer was obtained in the same manner as in Example 29 with the exception of using a copolymer (molecular weight: 100,000) consisting of a mixture of vinylidene fluoride/tetrafluoroethylene (=80/20, molar ratio) and using a mixture of acetone/methyl ethyl ketone (=1/1) as a solvent.

Test Example 10

Using the carriers obtained in Examples 29 to 32 and Comparison Examples 8 and 9, a test for determining the quantity of electrostatic charge imparted to the toner was conducted as follows.

A 100 parts by weight quantity of each carrier was admixed with 10 parts by weight of toner having a mean particle size of about 10 μm and consisting of 100 parts by weight of a styrene-based resin (trademark "Piccolastic D125", product of Esso Standard Oil Co., Ltd.), 10 parts by weight of carbon black (trademark "Regal 660R", product of Cabot Co., Ltd.) and a low-molecular-weight polypropylene (trademark "Viscol 660P", product of Sanyo Chemical Industry, Ltd.), and the quantity of electrostatic charge imparted to the toner (Q/M, unit: μc/g) was determined by the blow-off method.

Further, after the stirring of the mixture of the toner and the carrier by a ball mill for 1000 hours, the quantity of the charge imparted to the toner (Q/M, unit: μc/g) was determined once again by blow-off method.

Table 9 shows the results.

TABLE 9

| Example No. | Initial value | After 1000 hrs |
|---|---|---|
| Example 29 | +22 | +16 |
| Example 30 | +28 | +21 |
| Example 31 | +12 | +8 |
| Example 32 | +25 | +12 |
| Comp. Ex. 8 | +21 | +2 |
| Comp. Ex. 9 | +36 | +5 |

Table 9 shows that the carriers of the present invention are electrically charged with good stability.

In contrast, the carriers of Comparison Examples 8 and 9 are electrically charged with markedly poor stability. Presumably, such poor stability is attributable to an unsatisfactory adhesion of the coating layer to the carrier core material.

We claim:

1. A carrier for developing electrostatic images, the carrier comprising a core and a coating on the particulate core, the coating being formed from a composition containing the copolymer and a curing agent, the copolymer consisting essentially of (a) about 40 to about 90 mole % of at least one monomer selected from the group consisting of chlorotrifluoroethylene, tetrafluoroethylene, trifluoroethylene and hexafluoropropylene;

(b) about 9 to about 50 mole % of at least one of the monomers represented by the formula $CH_2{=}HOOCR$ wherein R is an alkyl, cycloalkyl or an aromatic group; and (c) about 1 to about 20 mole % of at least one monomer selected from the group consisting of hydroxyl group containing monomers of vinyl ether type, hydroxyl-group containing monomers of allyl ether type, hydroxyl group-containing monomers of acrylate type, carboxyl group-containing monomers and epoxy group-containing monomers.

2. A carrier according to claim 1 wherein the monomer (c) is selected from the group consisting of:
$CH_2{=}CHOCH_2CH_2CH_2CH_2OH$;
$CH_2{=}CHOCH_2CH(OH)CH_3$;
$CH_2{=}CHOCH_2CH_2OH$;
$CH_2{=}CHCH_2O(CH_2)_4OH$;
$CH_2{=}CHCH_2O(CH_2)_2OH$;
$CH_2{=}CHCOOCH_2CH_2OH$;
$CH_2{=}C(CH_3)COOCH_2CH_2OH$;
acrylic acid;
methacrylic acid;
itaconic acid;
maleic anhydride;
fumaric acid;
maleic acid;
α-fluoroacrylic acid;
α-chloroacrylic acid;

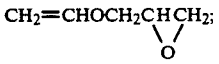

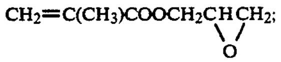
and

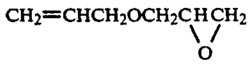

* * * * *